United States Patent
Borlez

(10) Patent No.: US 10,349,497 B2
(45) Date of Patent: Jul. 9, 2019

(54) RELATING TO LUMINAIRES

(71) Applicant: SCHREDER, Brussels (BE)

(72) Inventor: Yves Borlez, Heure-le-Romain (BE)

(73) Assignee: SCHREDER, Brussels (BE)

( * ) Notice: Subject to any disclaimer, the term of this patent is extended or adjusted under 35 U.S.C. 154(b) by 0 days.

(21) Appl. No.: 15/759,478

(22) PCT Filed: Sep. 13, 2016

(86) PCT No.: PCT/EP2016/071574
§ 371 (c)(1),
(2) Date: Mar. 12, 2018

(87) PCT Pub. No.: WO2017/046092
PCT Pub. Date: Mar. 23, 2017

(65) Prior Publication Data
US 2018/0263097 A1    Sep. 13, 2018

(30) Foreign Application Priority Data
Sep. 15, 2015   (EP) ..................... 15185322

(51) Int. Cl.
*H05B 37/02*    (2006.01)
*H02J 7/00*    (2006.01)
(Continued)

(52) U.S. Cl.
CPC ........ *H05B 37/0272* (2013.01); *H02J 7/0052* (2013.01); *H02J 7/02* (2013.01);
(Continued)

(58) Field of Classification Search
CPC .... H02J 7/02; H02J 9/02; H05B 37/02; H05B 37/0218; H05B 37/0227; H05B 37/0281
See application file for complete search history.

(56) References Cited

U.S. PATENT DOCUMENTS

2009/0066258 A1*  3/2009  Cleland .................... H02J 3/14
                                                       315/158
2012/0249017 A1* 10/2012  Grady ................ H05B 37/0218
                                                       315/360
(Continued)

FOREIGN PATENT DOCUMENTS

GB         2518865 A     4/2015

OTHER PUBLICATIONS

International Search Report dated Dec. 19, 2016, issued in corresponding International Application No. PCT/EP2016/071574, filed Sep. 13, 2016, 3 pages.

*Primary Examiner* — Thuy V Tran
(74) *Attorney, Agent, or Firm* — Christensen O'Conner Johnson Kindness PLLC

(57) ABSTRACT

A method of providing power for non-lighting related loads in which operate during daylight hours when a lighting dedicated switched mains network (220) is switched off is described. The method comprises charging a battery (240) at night from the mains network when the luminaire is switched on so that the energy/power stored in the battery can be used during the day. A luminaire (200) comprises a luminaire light engine (210) connected the mains network (220), an AC/DC down converter (230) also connected to the mains supply so that the battery (240) is charged during the hours of darkness. The battery (240) is connected to provide power to a DC non-lighting related load (250) which is operable both during daylight hours and hours of darkness.

23 Claims, 4 Drawing Sheets

(51) Int. Cl.
 *H02J 7/02* (2016.01)
 *H05B 33/08* (2006.01)
 *H02J 9/02* (2006.01)

(52) U.S. Cl.
 CPC ............ *H05B 33/0821* (2013.01); *H02J 9/02* (2013.01); *H05B 37/0218* (2013.01); *H05B 37/0227* (2013.01); *H05B 37/0281* (2013.01)

(56) References Cited

U.S. PATENT DOCUMENTS

2013/0234595 A1 9/2013 Martin et al.
2015/0256028 A1 9/2015 Suman
2016/0295658 A1* 10/2016 Chraibi .............. H05B 33/0845

* cited by examiner

RELATING TO LUMINAIRES

FIELD OF THE INVENTION

The present invention relates to improvements in or relating to luminaires, and is more particularly concerned with the provision of power for non-lighting related loads associated with such luminaires.

BACKGROUND OF THE INVENTION

Outdoor luminaires, otherwise known as streetlights, are positioned to provide lighting for streets, pavements and other areas that need to be illuminated at night. Such luminaires are connected to a lighting dedicated switched mains network so that each luminaire is switched on during the hours of darkness and switched off during daylight hours as no power is supplied to the luminaire during daylight hours.

In modern outdoor lighting environments, additional functionality may be required, for example, non-lighting related loads, such as sensors, cameras, transmitters, etc., which need to be powered during daylight hours when the lighting dedicated switched mains network is switched off.

JP-A-2010-272495 describes an outdoor luminaire which includes non-lighting related load, such as a motion sensor associated with a crime prevention camera and a charging point for a mobile phone. A battery is used as a power source for the non-lighting related load so that power is supplied during the day when the luminaire is switched off. The battery is connected to a solar panel so that it can be charged during daylight hours and is available for providing power for non-lighting related load.

IN/2010DEL/02996 describes a power system for a luminaire in which a solar panel is used to charge a battery whilst the sun is shining, the stored energy from the battery being used for powering both DC lighting related loads and DC non-lighting related loads. In addition, an AC supply from a mains supply may be used to power AC lighting related loads as is conventional as well as non-lighting related loads.

WO-A-2010/057138 describes an energy-efficient solar-powered outdoor lighting system in which a solar panel mounted on a supporting pole of a luminaire generates electricity which is stored in a battery housed in the base of the luminaire or underneath the luminaire and from which battery energy can be provided for non-lighting applications, for example, to power light-emitting diode elements at night. Alternatively, the battery may be positioned at another suitable location and connected to the luminaire by underground wiring. Power from the batteries may be used to supplement the grid during hours of peak electricity usage as well as being used for powering non-lighting functions, for example, camera and/or recorder for a security system, wireless network radio, motion sensors and photocells.

Whilst the use of batteries is known for providing energy for non-lighting related loads, such batteries tend to rely on relatively expensive alternative energy supplies, such as solar energy, to be able to charge the batteries during daylight hours when power from the electricity grid is effectively switched off.

There is therefore a need to be able to provide power for non-lighting related loads during periods when power from the electricity grid is switched off, for example, in daylight hours, without having to implement expensive alternative energy systems, such as, solar energy systems, energy harvesting using piezoelectric systems and thermoelectric systems, and wind turbines etc.

SUMMARY OF THE INVENTION

It is therefore an object of the present invention to provide a luminaire which incorporates an energy storage device which can be charged from a dedicated lighting switched mains network whilst the luminaire is switched on during non-daylight hours or hours of darkness, the stored energy being used to power non-lighting related loads during daylight hours when the luminaire is switched off.

In accordance with one aspect of the present invention, there is provided a method of supplying power to at least one non-lighting related load in a luminaire, the luminaire being connected to a lighting dedicated switched mains network which is switched on at least during hours of darkness and switched off during daylight hours, the method comprising the steps of:

a) charging an energy storage device from a supply provided by the lighting dedicated switched mains network when it is switched on; and b) using an energy supply from the energy storage device during daylight hours for the at least one non-lighting related load.

By charging an energy storage device using a supply from a mains network which is available at night, there is no need to rely on expensive alternative energy harvesting methods as described above, for supplying energy to non-lighting related loads during daylight hours.

In one embodiment, the method further comprise the step of down converting the supply from the lighting dedicated switched mains network, and step a) comprises using the down converted supply to charge the energy storage device.

In this way, an energy supply may be used directly from the energy storage device for the at least one non-lighting related load. In this case, the non-lighting related load may comprise a DC load.

In another embodiment, the method may further comprise up converting the energy supply from the energy storage device, and step b) comprises using the up converted supply for the at least one non-lighting related load.

This is the case where at least one non-lighting related load comprises an AC load.

In accordance with another aspect of the present invention, there is provided a luminaire connectable to a supply from a lighting dedicated switched mains network, the luminaire comprising:

a luminaire light engine configured to be switched with the lighting dedicated switched mains network to be on at least during hours of darkness and to be off during daylight hours;

at least one energy storage device connectable to the supply from the lighting dedicated switched mains network;

a first converter for converting the supply from the lighting dedicated switched mains network to a charging supply compatible with the at least one energy storage device; and at least one non-lighting related load connectable to the at least one energy storage device and configured for operation during daylight hours using energy from the at least one energy storage device.

In one embodiment, the at least one non-lighting related load comprises at least one DC load.

In another embodiment, a second converter may be provided for converting an energy supply from the energy storage device for the at least one non-lighting related load. In this case, the at least one non-lighting related load comprises at least one AC load.

It will readily be appreciated that it is possible to provide an energy supply for at least one of: DC and AC non-lighting related loads.

BRIEF DESCRIPTION OF THE DRAWINGS

For a better understanding of the present invention, reference will now be made, by way of example, to the accompanying drawings in which.

DESCRIPTION OF THE INVENTION

Figure 1:
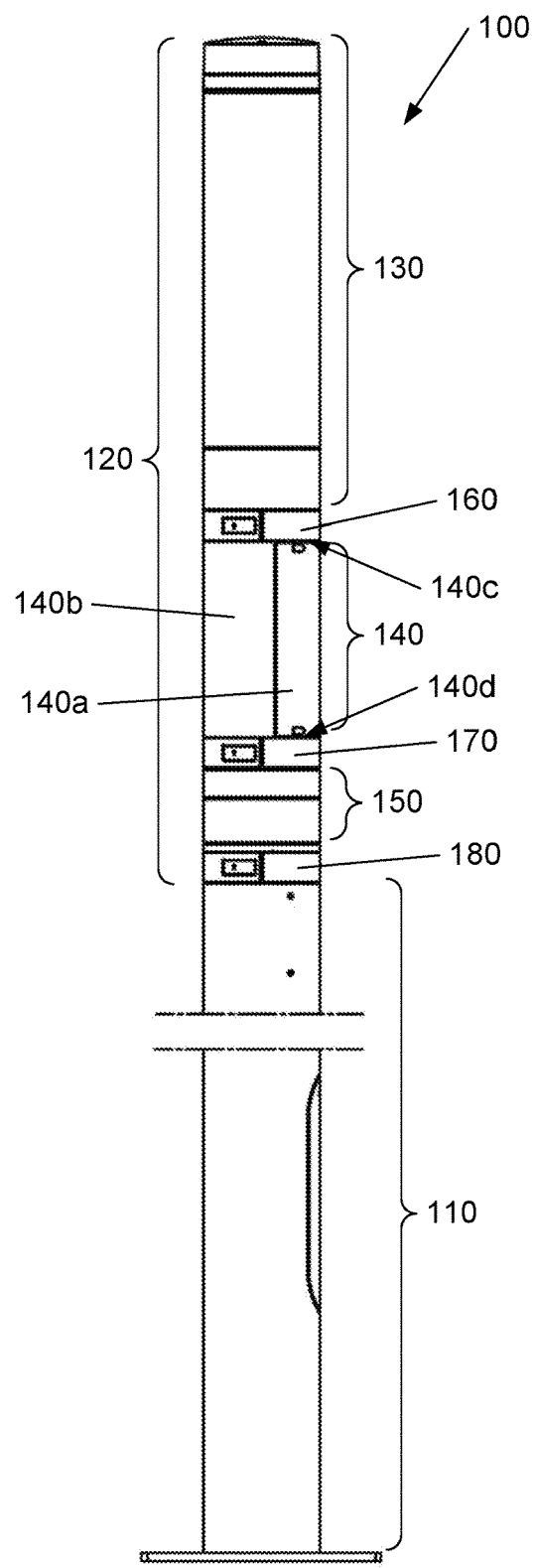
FIG. 1 illustrates a side view of a supporting pole of a luminaire assembly in accordance with the present invention.

The present invention will be described with respect to particular embodiments and with reference to certain drawings but the invention is not limited thereto. The drawings described are only schematic and are non-limiting. In the drawings, the size of some of the elements may be exaggerated and not drawn to scale for illustrative purposes.

The present invention will be described below with reference to a luminaire connected to a lighting dedicated mains switched mains network which is operated to have the luminaire turned on during the hours of darkness and turned off during daylight hours. The luminaire may comprise a modular luminaire assembly having a plurality of modules mounted on a supporting pole, each module having a predetermined functionality, or a conventional luminaire comprising lighting head mounted on a supporting pole.

In particular, the invention relates to providing power for non-lighting related loads that need to be powered during at least daylight hours when a lighting dedicated mains switched mains network is switched off. It will be appreciated that some non-lighting related loads may also need to be powered 24 hours a day with no interruption in power supply. Such a power supply may comprise a battery which is used to power only complementary loads, or non-lighting related loads, associated with a luminaire and not the luminaire itself.

In addition, the present invention enables modern luminaires comprising both lighting related and non-lighting related functionality to be installed on existing infrastructures where only a lighting dedicated mains switched mains network is available.

FIG. 1 illustrates a modular luminaire assembly 100 comprising a supporting pole 110 on which is mounted a plurality of modules 120, each module comprising a casing and effectively forming part of the supporting pole 110. In the illustrated embodiment, the plurality of modules comprises a first luminaire module 130, a second luminaire module 140, and a third luminaire module 150 which are connected to one another by module connectors 160, 170 and to the supporting pole 110 by module connector 180. Module connector 160 connects the first module 130 and the second module 140; module connector 170 connects the second module 140 and the third module 150; and module connector 180 connects the third module 150 to the supporting pole 110 as shown. The operation of the module connectors 160, 170, 180 is described in more detail below.

Each luminaire module 130, 140, 150 preferably comprises passageways (not shown) through which cabling can pass to adjacent modules, for example, coaxial cables would be threaded through luminaire modules as it is expensive to form connections which may create a loss in signal. In addition, each luminaire module may have one or more electrical connectors for providing electrical connections between.

Module 130 forms the uppermost module of the modular luminaire assembly 100, as shown in FIG. 1, as it is the lightest. Module 130 is substantially circular in cross-section and comprises a first (or top or upper) portion, a second (or bottom or lower) portion which is connectable to another module using a module connector, and a third (or central) portion between the first and second portions. The second portion includes a connector portion (not shown) which is connectable to a corresponding connector portion in another module (also not shown). The central portion may comprise a casing made of a lightweight transparent polymeric material, for example, polycarbonate, and may include a light-emitting diode (LED) array (not shown) for providing light which can be transmitted through the transparent polymeric casing.

Naturally, the type of polymeric material is chosen for its optical properties and for its durability and resistance to ultraviolet (UV) radiation when used in an exterior deployment.

In other embodiments, the polymeric material from which the casing is made may be opaque or transparent, and may also include non-lighting related functions or loads (also not shown), for example, a Wi-Fi transceiver module, a loudspeaker module, one or more camera modules, a video surveillance module, etc. In addition, the material from which the casing is made is not limited to polymeric materials and may comprise any other suitable lightweight and inexpensive material.

The first portion may include apertures (not shown) for antennas in accordance with particular use for each modular luminaire assembly. Such antennas are connected to coaxial cabling extending through passageways provided in the supporting pole 110 and in other luminaire modules as described above.

As described above, the second portion includes a connector portion or interface which engages a complementary connector portion or interface (not shown) provided in an adjacent module, for example, module 140, and which is held together by module connector 160.

Module 140 comprises a casing having a substantially circular cross-section but which is divided into a first part 140*a* made of a transparent polymeric material, such as polycarbonate, and a second part 140*b* made of a metallic material, such as aluminium. By having such a division in the casing, light can be directed in a predetermined direction as defined by the angle subtended by the first portion 140*a*. In this case, the module 140 may include an LED array (not shown) which provides light for transmission by the first part 140*b*. As mentioned above, the transparent polymeric material is intended to have particular properties.

For non-lighting related functions, the polymeric material of which the casing is made may be opaque or non-transparent. In addition, the material from which the casing is made is not limited to polymeric materials and may comprise any other suitable lightweight and inexpensive material.

Connector portions or interfaces (not shown) are provided at a first (or top or upper) end 140*c* and at a second (or bottom or lower) end 140*d*. The complementary connector portions or interfaces are held together by module connector 170.

Module 150 may comprise a casing having a substantially circular cross-section in which one or more LED arrays may be provided. Such LED arrays may comprise a single array having LED elements of only one colour, a single array having LED elements of more than one colour, for example, RGB (red/green/blue), which can be switched in one or more predetermined patterns to provide visual effects or for signalling purposes. In this case, the casing may comprise a transparent or semi-transparent material polymeric material through which the light from the LED elements can be transmitted.

Module 150 is mounted to the supporting pole 110 by way of a connector portion or an interface formed at a lower end (or bottom end), as shown in FIG. 1, of the module and a complementary connector portion or interface formed at an upper end (or top end) of the supporting pole 110. The complementary connector portions or interfaces are held together by module connector 180.

Although three luminaire modules and three module connectors are shown in FIG. 1, it will readily be appreciated that any appropriate number of luminaire modules may be mounted on the supporting pole and connected to one another and to the supporting pole by a corresponding number of module connectors.

In addition, at least one luminaire module may have a functionality which is unrelated to the provision of lighting or may have a combination of the lighting-related and lighting-unrelated functionalities as described above.

The modular luminaire assembly may further comprise a support module operable for being mounted on the supporting pole in order to provide an interface allowing the mounting of the modules on top of the supporting pole. Such a support module may be adapted for mounting on either a pole of same diameter as the modules or a pole of different diameter to that of the modules.

Empty modules may also be provided for further expansion of the functionality of the luminaire and/or for uniformity in height of luminaires in a particular area.

Although the present invention will be described below with reference to providing power for non-lighting related loads during daylight hours, it will readily be appreciated that non-lighting related loads also need to be powered during the hours of darkness and the present invention may also be used for providing power to non-lighting related loads during the hours of darkness.

Figure 2:
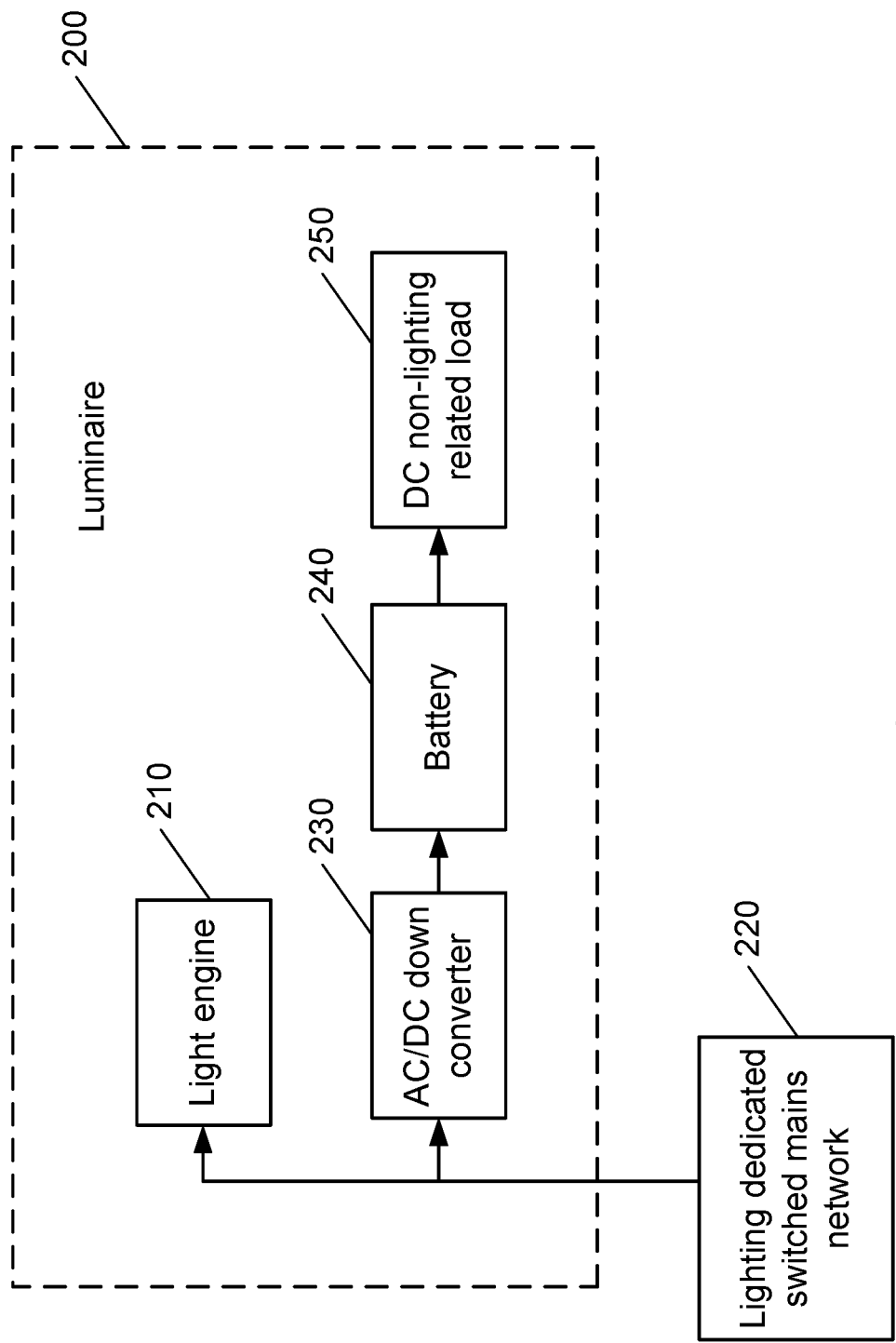
FIG. 2 illustrates a block diagram of a first embodiment of the present invention for powering DC non-lighting related loads.

Turning now to FIG. 2, a block diagram of a luminaire 200 is shown which comprises a luminaire light engine 210 connected to a lighting-dedicated switched mains network 220. Although not shown in detail in FIG. 2, the luminaire 200 may comprise a modular luminaire assembly as described with reference to FIG. 1 in which at least one lighting module is provided and which is mountable on a supporting pole. In another embodiment, the luminaire may comprise a non-modular luminaire assembly including a lighting head mounted on a supporting pole. In either embodiment, the lighting functionality of the luminaire is switched on and off by the switching of the lighting-dedicated switched mains network 220.

The lighting-dedicated switched mains network 220 is connected to an electricity grid (not shown) and operates to switch the luminaire light engine 210 on and off in accordance with at least one predetermined dimming profile. Such a predetermined dimming profile may simply correspond to on and off times for the luminaire in accordance with an associated clock, the on and off times being adjusted in accordance with the season so that the luminaire light engine 210 is on and providing light during hours of darkness and off during hours of daylight. The dimming profile may also be more complex in that sensory inputs may be utilised for modifying a predetermined dimming profile, for example, a photocell may be used to adjust the lighting levels outside of the normal on and off times in accordance with sensed ambient lighting conditions, or a motion sensor which senses the presence of motion in the vicinity of the luminaire and changes (increases) the light intensity generated by the luminaire light engine 210 for better (temporary) illumination.

As shown, the lighting-dedicated switched mains network 220 is also connected to an AC/DC down converter 230 which is connected to a battery 240. The AC/DC down converter 230 comprises a voltage transformer and rectifier that converts a mains AC voltage at around 230V and 50 Hz to a suitable DC voltage which can charge the battery 240.

The battery 240 is connected to a DC non-lighting related load 250 and supplies power for the operation thereof. Although only one DC non-lighting related load is shown, it will be appreciated that there may be more than one such DC non-lighting related load which is powered by the battery 240.

The battery 240 comprises a rechargeable battery which is charged by the lighting dedicated switched mains network 220 when the luminaire light engine 210 is on during the hours of darkness so that the energy stored in the battery 240 can be used during the daytime for non-lighting related functionality when the lighting dedicated switched mains network is off. The rechargeable battery may comprise a single rechargeable energy cell or a battery pack comprising a plurality of rechargeable energy cells. In addition, more than one rechargeable battery may be connected to the AC/DC down converter 230 with each rechargeable battery being connected for providing power to one or more DC non-lighting load(s).

It will readily be appreciated that each DC non-lighting load may have a dedicated rechargeable battery, or that each rechargeable battery powers more than one DC non-lighting load.

In one embodiment, a single AC/DC down converter 230 is provided which is connected to a single battery 240 as described above. In another embodiment, more than one AC/DC down converter 230 may be provided each of which is connected to a battery 240 as described above.

The battery 240 may comprise a series of rechargeable battery elements, each battery element being connected, in turn, to supply power for non-lighting related loads, so that each battery element is not being charged and discharged at the same time. This is the case in the hours of darkness when non-lighting related loads are still powered by battery. In an alternate embodiment, the series of rechargeable battery elements may be charged and discharged at the same time, for example, when non-lighting related loads need to be powered during the hours of darkness.

As described above, non-lighting related loads are powered from the battery 240 both during daylight hours and the hours of darkness. It will be appreciated, however, that the battery 240 may be used for providing power only during daylight hours for the non-lighting loads and power may be supplied to non-lighting related loads directly from the lighting-dedicated switched mains network 220 during the hours of darkness through AC/DC down converter 230 (not shown).

Figure 3:
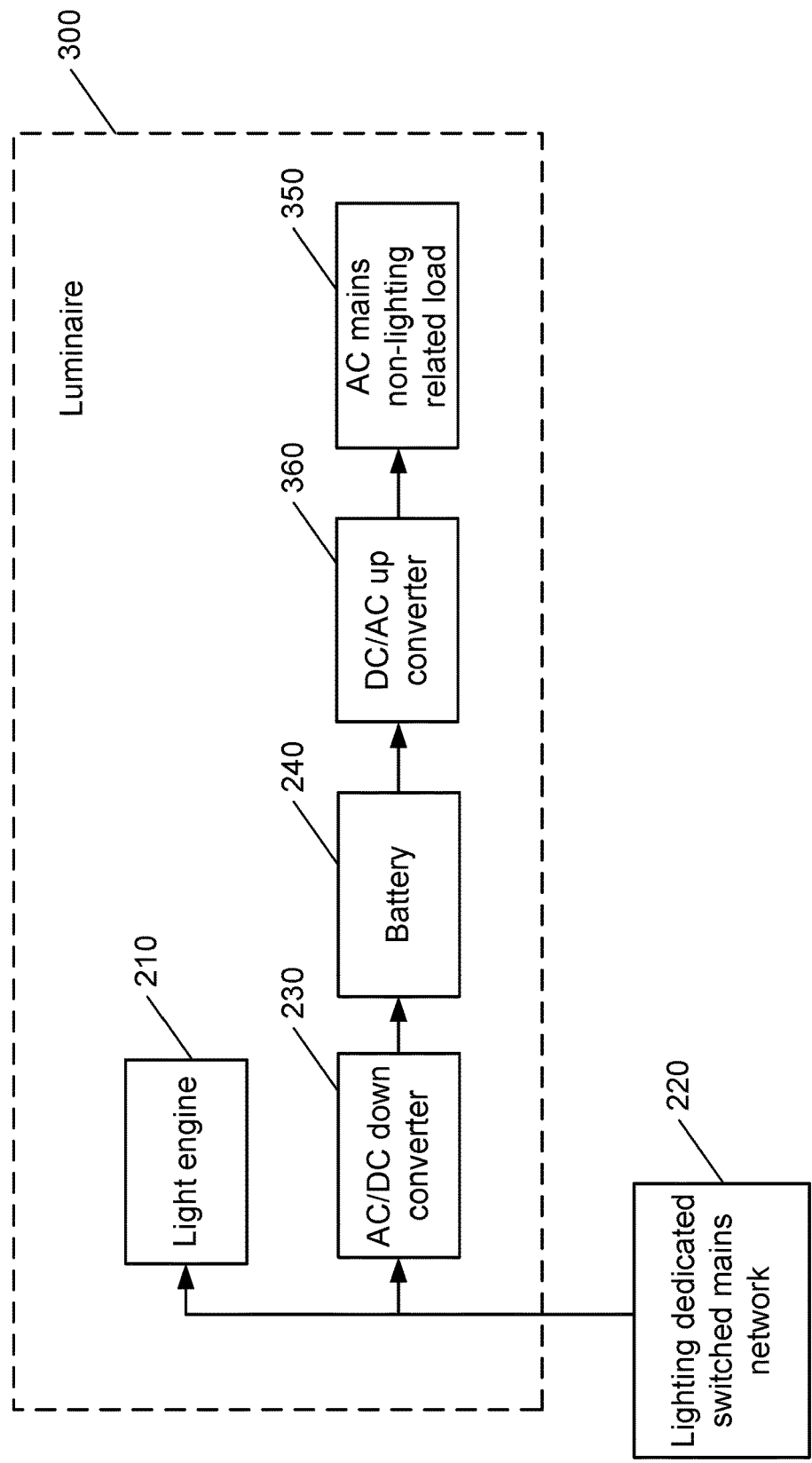
FIG. 3 illustrates a block diagram of a second embodiment of the present invention for powering AC non-lighting related loads.

The present invention is not limited to the powering of DC non-lighting loads during daylight hours but could also be used for powering AC non-lighting loads during those hours. In this case, an up converter will be required for converting the DC voltage supplied from the battery to an AC voltage. This is illustrated in FIG. 3. Components which have been described previously bear the same reference numerals.

In FIG. 3, a luminaire 300 is shown which uses stored energy for powering AC mains non-lighting related loads. The luminaire 300 is similar to luminaire 200 in that it comprises a luminaire light engine 210 connected to a lighting dedicated switched mains network 220, and an AC/DC down converter 230 connected to a battery 240. As these components have been described above, they will not be described again here in detail.

Luminaire 300 also comprises an AC mains non-lighting related load 350 which is powered by the battery 240 via a DC/AC up converter 360. The DC/AC up converter may comprise a power inverter and transformer for converting DC voltage from the battery 240 to an AC voltage required by the AC non-lighting related load.

Whilst the DC/AC up converter 360 is required for powering AC non-lighting related loads during daylight hours from the battery 240, it will readily be appreciated that, during the hours of darkness when the lighting dedicated switched mains network 220 is switched on, the AC non-lighting related loads may be powered directly from the mains network without having to be powered from the battery 240.

Figure 4:
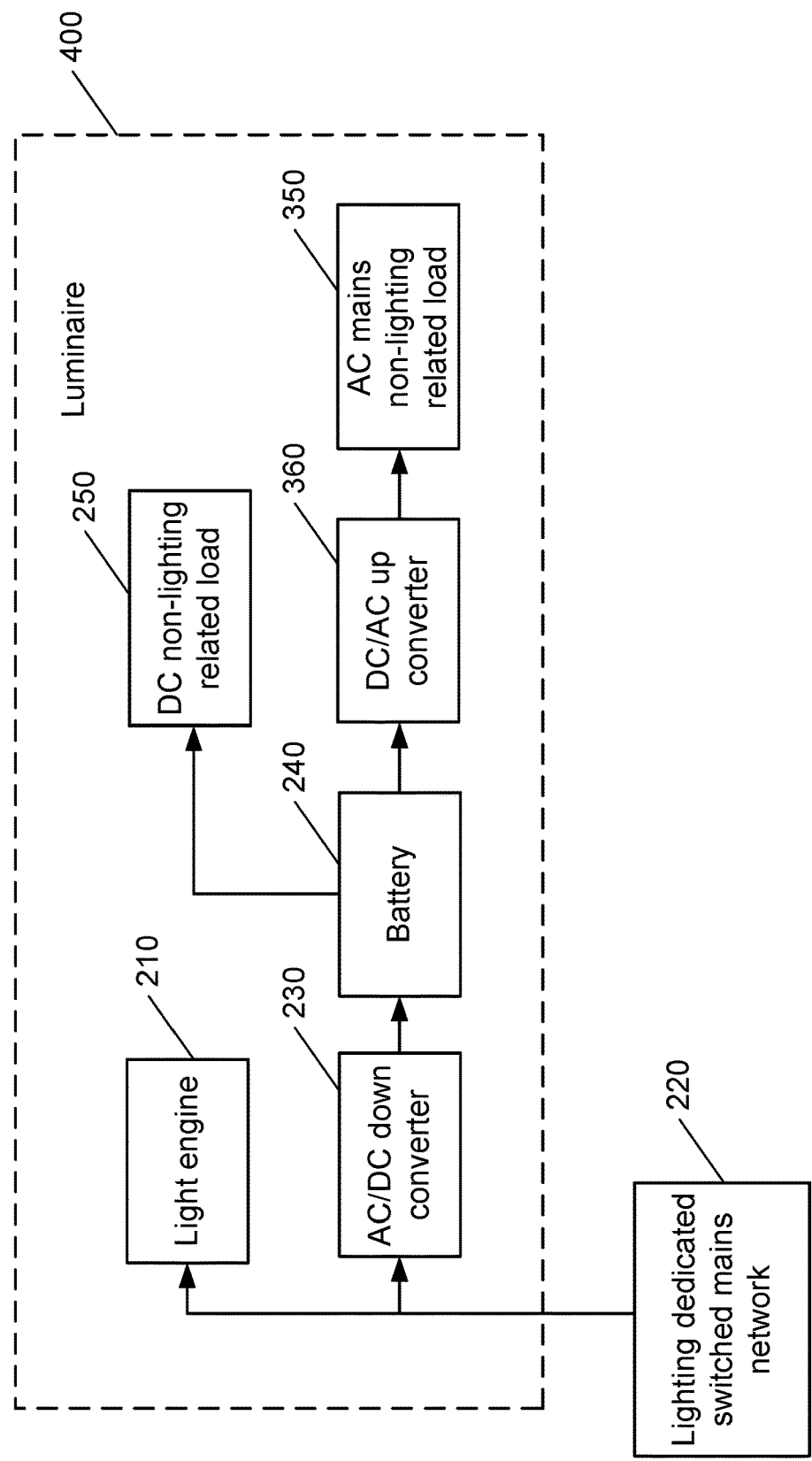
FIG. 4 illustrates a block diagram of a third embodiment of the present invention for powering both AC and DC non-lighting related loads.

It will readily be appreciated that the luminaire may comprise a combination of the luminaires illustrated in FIGS. 2 and 3. Such a luminaire 400 is shown in FIG. 4. Components described above with reference to FIGS. 2 and 3 bear the same reference numbers and will not be described again here in detail.

Although the luminaires 200, 300, 400 are described as having all the components located therein, it will readily be appreciated that some of the components need to be located within the luminaire, for example, the luminaire light engine which supplies the lighting related functionality, whilst others may be located outside of the luminaire but associated therewith. For example, for a group of luminaires, a single AC/DC converter may be provided which is connected to a battery, and, each luminaire may be connected to the battery for supplying power to its associated DC non-lighting related load. Similarly, if the non-lighting related load comprises an AC load, each luminaire may be associated with an DC/AC up converter through which the DC battery voltage is converted to an AC voltage for the AC non-lighting related load.

It will readily be appreciated that any other suitable distribution of components is possible.

Whilst the present invention has been described with reference to one or more rechargeable batteries as an energy storage device, it will be understood that other forms of energy storage devices may be used, for example, super capacitors, which store electrical energy from the lighting dedicated switched mains network when it is switched on and which can supply energy to non-lighting related loads during daylight hours and/or during hours of darkness in accordance with the particular implementation.

The invention claimed is:

1. A method of supplying power to at least one non-lighting related load in a luminaire, the luminaire being connected to a lighting dedicated switched mains network which is switched on at least during hours of darkness and switched off during daylight hours, the method comprising the steps of:
   a) down converting the supply from the lighting dedicated switched mains network;
   b) charging an energy storage device from a supply provided by the lighting dedicated switched mains network when it is switched on, which comprises using the down converted supply to charge the energy storage device;
   c) up converting the energy supply from the energy storage device; and
   d) using an energy supply from the energy storage device during daylight hours for the at least one non-lighting related load, which comprises using the up converted supply for the at least one non-lighting related load.

2. A method according to claim 1, wherein step d) comprises using an energy supply directly from the energy storage device for the at least one non-lighting related load.

3. A method according to claim 2, wherein the at least one non-lighting related load comprises a DC load.

4. A method according to claim 1, wherein the at least one non-lighting related load comprises an AC load.

5. A method according to claim 1, wherein the luminaire is a streetlight.

6. A method according to claim 1, wherein the lighting dedicated switched mains network operates to switch a luminaire light engine on and off in accordance with at least one predetermined dimming profile.

7. A method according to claim 1, wherein the at least one non-lighting related load is a Wi-Fi transceiver module, a loudspeaker module, one or more camera modules, a video surveillance module, a camera, a sensor, a photocell, or a motion sensor.

8. A luminaire connectable to a supply from a lighting dedicated switched mains network, the luminaire comprising:
   a luminaire light engine configured to be switched with the lighting dedicated switched mains network to be on at least during hours of darkness and to be off during daylight hours;
   at least one energy storage device connectable to the supply from the lighting dedicated switched mains network;
   a first converter for converting the supply from the lighting dedicated switched mains network to a charging supply compatible with the at least one energy storage device;
   at least one non-lighting related load connectable to the at least one energy storage device and configured for operation during daylight hours using energy from the at least one energy storage device; and
   a second converter for up converting an energy supply from the energy storage device for the at least one non-lighting related load, which comprises at least one AC load.

9. A luminaire according to claim 8, wherein the at least one non-lighting related load comprises at least one DC load.

10. A luminaire according to claim 8, wherein the luminaire is a streetlight.

11. A luminaire according to claim 8, wherein the luminaire comprises a supporting pole.

12. A luminaire according to claim 8, wherein the luminaire comprises a modular luminaire assembly comprising a plurality of modules.

13. A luminaire according to claim 12, wherein the modules are mounted on a supporting pole.

14. A luminaire according to claim 13, wherein each module comprises a casing and effectively forms part of the supporting pole.

15. A luminaire according to claim 14, further comprising module connectors connecting the modules to one another and connecting one of the modules to the supporting pole.

16. A luminaire according to claim 12, wherein each luminaire module comprises passageways through which cabling can pass to adjacent modules.

17. A luminaire according to claim 16, further comprising coaxial cabling threaded through several luminaire modules.

18. A luminaire according to claim 17, further comprising an antenna connected to the coaxial cabling.

19. A luminaire according to claim 12, wherein each luminaire module has one or more electrical connectors for providing electrical connections.

20. A luminaire according to claim 8, wherein the at least one non-lighting related load is a Wi-Fi transceiver module, a loudspeaker module, one or more camera modules, a video surveillance module or a camera.

21. A method of supplying power to at least one non-lighting related load in a luminaire, the luminaire being connected to a lighting dedicated switched mains network which is switched on at least during hours of darkness and switched off during daylight hours, the method comprising the steps of:
  a) charging an energy storage device from a supply provided by the lighting dedicated switched mains network when it is switched on; and
  b) using an energy supply from the energy storage device during daylight hours for the at least one non-lighting related load,
  wherein the at least one non-lighting related load is a loudspeaker module, one or more camera modules, a video surveillance module, a camera, a sensor, a photocell, or a motion sensor.

22. A luminaire connectable to a supply from a lighting dedicated switched mains network, the luminaire comprising:
  a luminaire light engine configured to be switched with the lighting dedicated switched mains network to be on at least during hours of darkness and to be off during daylight hours;
  at least one energy storage device connectable to the supply from the lighting dedicated switched mains network;
  a first converter for converting the supply from the lighting dedicated switched mains network to a charging supply compatible with the at least one energy storage device; and
  at least one non-lighting related load connectable to the at least one energy storage device and configured for operation during daylight hours using energy from the at least one energy storage device,
  wherein the at least one non-lighting related load is a loudspeaker module, one or more camera modules, a video surveillance module, a camera, a sensor, a photocell, or a motion sensor.

23. A luminaire connectable to a supply from a lighting dedicated switched mains network, the luminaire comprising:
  a luminaire light engine configured to be switched with the lighting dedicated switched mains network to be on at least during hours of darkness and to be off during daylight hours;
  at least one energy storage device connectable to the supply from the lighting dedicated switched mains network;
  a first converter for converting the supply from the lighting dedicated switched mains network to a charging supply compatible with the at least one energy storage device; and
  at least one non-lighting related load connectable to the at least one energy storage device and configured for operation during daylight hours using energy from the at least one energy storage device,
  wherein the luminaire comprises a modular luminaire assembly comprising a plurality of modules comprising passageways through which cabling can pass to adjacent modules.

* * * * *